United States Patent [19]

Rise

[11] Patent Number: 5,322,625
[45] Date of Patent: Jun. 21, 1994

[54] FILTER ELEMENT FOR A GRAVITY-FLOW WATER FILTER

[76] Inventor: Gerald Rise, 431 Oakland Ave., Oakland, Calif. 94611

[21] Appl. No.: 927,020

[22] Filed: Aug. 6, 1992

Related U.S. Application Data

[63] Continuation-in-part of Ser. No. 636,577, Jan. 2, 1991, abandoned, which is a continuation-in-part of Ser. No. 551,129, Jul. 9, 1990, abandoned, which is a continuation-in-part of Ser. No. 346,061, May 2, 1989, abandoned, which is a continuation-in-part of Ser. No. 174,209, Mar. 28, 1988, abandoned.

[51] Int. Cl.$^5$ ............................................. B01D 24/22
[52] U.S. Cl. .................................... 210/238; 210/248; 210/249; 210/282
[58] Field of Search ............... 210/238, 248, 249, 282, 210/289, 446, 449, 460, 468, 469, 470, 471

[56] References Cited

U.S. PATENT DOCUMENTS

| | | | |
|---|---|---|---|
| 153,406 | 7/1874 | Vaders | 210/249 |
| 643,181 | 2/1900 | Woodworth | 210/460 |
| 738,486 | 9/1903 | Rogers | 210/449 |
| 1,028,054 | 5/1912 | Moore | 210/460 |
| 1,774,004 | 8/1930 | Haslett | 210/449 |
| 2,033,533 | 3/1936 | Moore | 210/289 |
| 2,167,225 | 7/1939 | Van Eweyk | 210/103 |
| 2,224,577 | 12/1940 | Shively | 210/105 |
| 3,385,446 | 5/1968 | Ward | 210/266 |
| 3,462,361 | 8/1969 | Greenwalt et al. | 210/23 |
| 3,529,726 | 9/1970 | Keenan | 210/232 |
| 3,536,197 | 10/1970 | Ward | 210/120 |
| 3,715,035 | 2/1973 | Teeple | 210/249 |
| 3,747,767 | 7/1973 | Hankammer | 210/282 |
| 4,094,779 | 6/1978 | Behrman | 210/40 |
| 4,306,971 | 12/1981 | Hankammer | 210/282 |
| 4,419,235 | 12/1983 | Sway | 210/282 |

OTHER PUBLICATIONS

Brita ® Filter. Undated Flyer, ca. 1989. Title ". Brita Pure and Simple". Brita America Inc., Palisades Park, N.J. 07650.
Filbrook TM Filter. Undated Flyer, ca. 1986. Title "Filbrook Drinking Water Filter Kit". P. B. Enterprises, Woodstock, Vt. 05091.
Innova ® Filter. Undated Flyer, ca. 1991. Title "Doctors Say". Innova ® Pure Water Inc., Clearwater, Fla. 34620.

*Primary Examiner*—Ivars Cintins

[57] ABSTRACT

A filter element 28 for a gravity-flow water filter. An inlet screen 44 divides a cylinder 48 into two functionally distinct portions, an overflow chamber 24, and a filter body 26 which contains a filter medium 54. A wire half-loop 16 suspends overflow chamber 24 from an adjustable water source and positions overflow chamber 24 to catch the water outflow from the source. Wire half-loop 16 also positions overflow chamber 24 at a distance from the source so that there is a gap 22 between overflow chamber 24 and the source. The potential for water rising and spilling from overflow chamber 24 induces a user to adjust the source flow to less than a characteristic rate. When the flow is adjusted so that water level in overflow chamber 24 is not rising, the water level continues dropping until the flow of water from the source continuously enters the screened entrance of filter body 26 with no appreciable pressure head. Thus water moves more slowly through filter body 26 and filter medium 54 than if there were an appreciable pressure head at the entrance to filter body 26. With slower water motion, there is longer water-to-filter-medium contact, giving superior filtering effectiveness. Filtered water from filter element 28 is captured and accumulated in a receiver container 40 for later use.

14 Claims, 2 Drawing Sheets

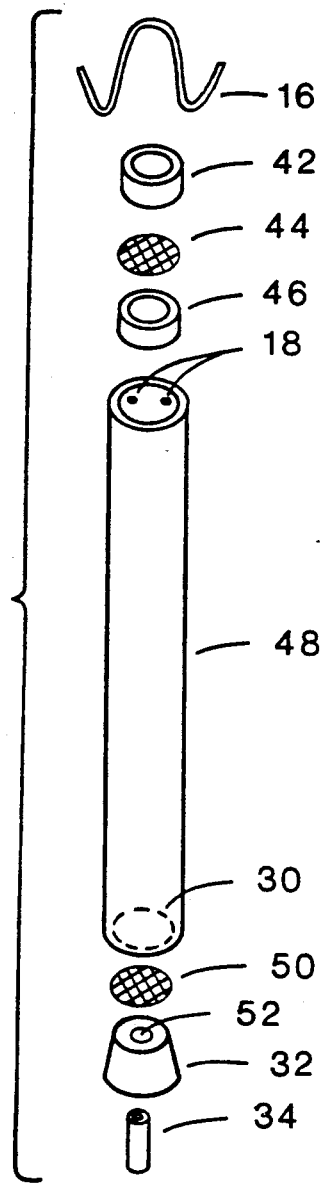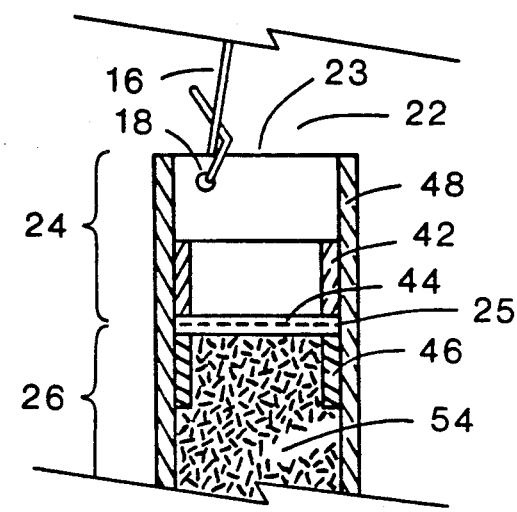
FIG 2
FIG 3

FILTER ELEMENT FOR A GRAVITY-FLOW WATER FILTER

CROSS REFERENCE TO RELATED APPLICATION

This application is a continuation-in-part of application Ser. No. 07/636,577, filed Jan. 2, 1991, now abandoned; which application is a continuation-in-part of application Ser. No. 07/551,129, filed Jul. 9, 1990, now abandoned; which application is a continuation-in-part of application Ser. No. 07/346,061, filed May 2, 1989, now abandoned; which application is a continuation-in-part of application Ser. No. 07/174,209, filed Mar. 28, 1988, now abandoned.

BACKGROUND

1. Field of Invention

This invention relates to home treatment of water and specifically relates to an improved filter element for a gravity-flow water filter.

2. Filter Types and Terms

Pressurized water filters are connected to pressurized water lines. Gravity-flow filters have gravity acting locally as the motive force causing water through flow.

Gravity-flow filters, also called "pour through filters", may generally be described as having a reservoir above a filter body containing a filter medium. Water enters the reservoir, flows downward and then flows through an inlet into the filter body. Water passes through the filter medium and falls into a receiver below the filter body.

Gravity-flow filters usually have lower water pressure at the inlet, lower pressure drop across the filter body, lower flow rates, lesser strength requirements because of low internal pressures, and different physical support than have pressurized filters.

3. A Stability Constraint On Filter Body Height

A gravity-flow filter system may stack reservoir atop filter body atop receiver, with the weight of all resting on the base of the receiver. The taller the filter body, the longer is the water path through the medium and the greater the filtering effectiveness. However, the taller the filter body, the more liable is the stack to tipping and falling. Thus stability considerations place a constraint on the height of the filter body.

3. Description of Prior Art

The filters of U.S. Pat. No. 2,167,225 to Van Eweyk (1939), U.S. Pat. No. 2,224,577 to Shively (1940), U.S. Pat. No. 4,419,235 to Sway (1983), U.S. Pat. No. 3,747,767 to Hankammer (1973), U.S. Pat. No. 4,306,971 to Hankammer (1981), the BRITA TM filter (trademark of Brita, Inc., Palisades Park, N.J.), the FILBROOK TM filter (trademark of P. B. Enterprises, Woodstock, Vt.) and the Innova TM filter (trademark of Innova Pure Water, Inc., Clearwater, Fla.) all use the stack with reservoir atop filter body atop receiver, the weight of all resting on the receiver. Consequently, all these have a serious limitation on filter body height due to the stability constraint.

The filters of U.S. Pat. No. 3,536,197 to S. L. Ward (1970), U.S. Pat. No. 2,033,533 to G. Moore (1936) and U.S. Pat. No. 4,094,779 to Behrman (1978) each utilize a dedicated stand to support various filter parts.

The filters of U.S. Pat. No. 738,486 to Rogers (1903), U.S. Pat. No. 1,774,004 to Haslett (1930) and U.S. Pat. No. 3,529,726 to Keenan (1970) all show watertight connections to a pressurized water source and hence have no gap between source and filter body. Rogers and Haslett show chains which aid in securing the watertight connection.

The devices of U.S. Pat. No. 153,406 to Vaders (1874), U.S. Pat. No. 643,181 to Woodworth (1900) and U.S. Pat. No. 1,028,054 to M. A. Moore (1912) all show mesh screens held in the outflow stream of a water source, but none uses a filter medium. These devices are related to the modern aerator found on the end of most new kitchen and bathroom faucets, which aerator also holds a mesh screen in an outflow.

U.S. Pat. No. 3,385,446 to F. E. Ward et al. (1968) shows a filter device stably supported by being hand held. If more than a quart or so is to be filtered, and if the liquid is to flow through slowly for efficient filtration, then surely holding by hand would be tedious and inconvenient.

The filter of U.S. Pat. No. 3,462,361 to Greenwalt et al. (1969) uses a stopper at the filter body's inlet. No support means is shown for this filter element.

The Innova TM filter has a reservoir, filter body and receiver combined in a single unit which is placed under a kitchen faucet for the filtering operation. The device shows no structure to suspend from and position itself under the faucet.

The filter of U.S. Pat. No. 3,715,035 to Teeple et al. (1973) shows a flexible bag reservoir that slumps below the inlet to a filter element. The bag is to be filled with water, and after sediment settles, Teeple provides a structure to elevate part of the bag above the inlet so that water enters the inlet. A receiver bag is attached to the filter body.

OBJECTS AND ADVANTAGES

Accordingly I claim one object of the present invention is to filter water effectively, conveniently, and economically for home use, to remove chlorine and certain pollutants from the water, and to improve its taste and smell.

I claim as an advantage of the present invention that it provides a flow of water into the filter element with no appreciable pressure head of water at the inlet to the filter element, which state of flow and pressure head is named a "virtual zero pressure head." This feature gives superior filtering by allowing water to move more slowly through the filter medium than if there were an appreciable pressure head at the inlet. This results in longer contact between water and filter medium, thereby enhancing removal of water pollutants.

Several additional advantages are as follows:

(a) The present invention allows use of a refillable dispenser as an adjustable water source. A refillable dispenser is a container for liquids, having an adjustable dispensing spigot and an opening through which the refillable dispenser may be refilled for repeated use. A refillable dispenser is easily positioned to provide a generous clearance under the spigot, a clearance for which a long, effective filter column may be designed.

(b) The present invention allows use, as a refillable dispenser, of the widely available 2½ gallon dispenser made by Liqui-Box Corp. of Worthington, Ohio or the 2½ gallon dispenser made by Pro-Pak Corp. of Toledo, Ohio. To be refillable, these dispensers must be modified by cutting an opening in the upper surface; see filler opening 10 in FIG. 1.

(c) By not attaching the associated receiver to the filter body, the present invention lessens the pendent operational weight on the spigot of a refillable dispenser, thereby lessening the possibility of causing the refillable dispenser to tip and fall.

(d) By not attaching a dedicated receiver to the filter body, a wide variety of containers may be used as receivers. The filter operator may obtain, for reuse as receivers, glass and plastic jugs and bottles, and the refillable dispensers described in (b) above. A number of gallon jugs could be filled consecutively in one operation, thereby accumulating a several-day supply of filtered water.

(e) Removing the stopper at the bottom of the filter body allows extraction of exhausted filter media. Loose, fresh filter media may be inserted. The need for a disposable filter cartridge is thereby avoided.

(f) Sediment may clog a filter using filter media. The stopper of this invention, which may be put into and withdrawn from the outlet, allows extraction of the filter media for a swirling wash to remove sediment. The filter media may then be reinserted. Thus the need for a pre-filter for sediment may be avoided and the useful lifetime of the filter media may be extended.

DRAWING FIGURES

FIG. 2 shows a perspective exploded view of the filter element according to the invention.

FIG. 3 is a sectional view of the upper portion of the filter element taken along the line 3—3 of FIG. 1.

Figure 1:
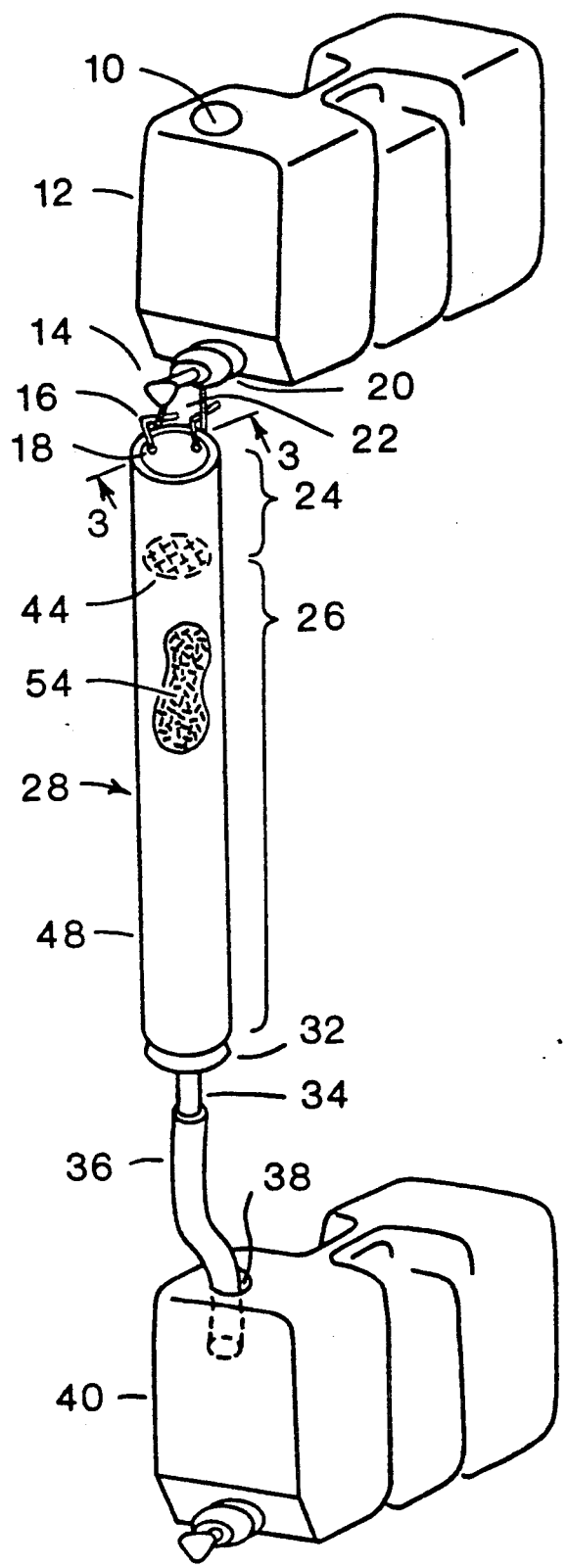
FIG. 1 shows a perspective view of the filter element in use with a refillable dispenser and a receiver container.

DRAWING REFERENCE NUMERALS 10 filler opening on 12
12 refillable dispenser
14 tab on 20
16 wire half-loop
18 lip holes on 24
20 adjustable spigot on 12
22 gap
23 entrance to 24
24 overflow chamber
25 inlet
26 filter body
28 filter element
30 outlet
32 stopper
34 nipple
36 flexible tube
38 top opening on 40
40 receiver container
42 upper collar
44 inlet screen
46 lower collar
48 cylinder
50 outlet screen
52 axial through hole in 32
54 filter medium

DESCRIPTION OF FILTER ELEMENT

In the preferred embodiment of the invention shown in FIG. 1, a filter element 28 containing a filter medium 54 is suspended from and substantially below an adjustable spigot 20 on a refillable dispenser 12. Refillable dispenser 12 is a modified 2½ gallon dispenser made by LiquiBox Corp. of Worthington, Ohio, a container for liquids having adjustable spigot 20. A LiquiBox ™ dispenser is modified by cutting a filler opening 10 so that it may be refilled for repeated use, thereby converting a dispenser into a refillable dispenser. Refillable dispenser 12 rests at the edge of an elevated surface such as a table or countertop. There is a receiver container 40 positioned below filter element 28 to catch filtered water.

FIG. 1 shows refillable dispenser 12 having a filler opening 10 and adjustable spigot 20 that is controlled by moving a tab 14. A wire half-loop 16 is formed by a length of flexible wire with memory to retain shape. Each end of the wire is passed through a different lip hole 18 in the top of filter element 28 and loosely twisted back around itself to make wire half-loop 16. Thus the length of wire half-loop 16 can be varied. Wire half-loop 16 is hung over adjustable spigot 20, whereby filter element 28 is suspended from refillable dispenser 12. Wire half-loop 16 positions filter element 28 to capture the water outflow from adjustable spigot 20. Wire half-loop 16 positions filter element 28 so that there is a gap 22 between adjustable spigot 20 and filter element 28, whereby the connection between adjustable spigot 20 and filter element 28 is a non-watertight connection.

As shown in FIGS. 1 and 2, a stopper 32 of compressible material is inserted with a watertight fit into an outlet 30 of filter element 28. A nipple 34 comprising a length of rigid tube is press fitted into an axial through hole 52 in stopper 32. A flexible tube 36 (FIG. 2) is press fitted with a detachable connection over the lower end of nipple 34. The lower end of flexible tube 36 is inserted into a top opening 38 on receiver container 40.

FIG. 2 shows a perspective exploded view of filter element 28. An upper collar 42 and a lower collar 46 are both cylindrical in shape and sized to fit snugly into a cylinder 48, a hollow cylinder of impermeable material with both ends open. An inlet screen 44 is a circular foraminous mesh screen sized to fit snugly inside cylinder 48.

The placement of collars 42 and 46 and inlet screen 44 inside cylinder 48 is shown in FIG. 3, a sectional view. The collars are permanently fixed close together, holding inlet screen 44 in a fixed position between the collars. This placement of inlet screen 44 defines and establishes the position of an inlet 25 within cylinder 48. Inlet 25 is an opening to a filter body 26. The placement of inlet screen 44 thus divides cylinder 48 into two functionally distinct portions as follows: the portion below inlet screen 44 is filter body 26, and the portion above inlet screen 44 is an overflow chamber 24.

Overflow chamber 24 is formed by an impermeable, stiff wall surrounding inlet 25 in a watertight connection. The upper edge of the wall defines an entrance 23 to overflow chamber 24. Overflow chamber 24 has fluid holding capacity of 0.4 liters.

FIG. 2 shows an outlet screen 50, a circular foraminous mesh screen sized to fit snugly into cylinder 48. Screen 50 rests atop stopper 32, covering the upstream interior end of axial through hole 52. Inlet screen 44 and outlet screen 50 are the foraminous devices which confine filter medium 54 within filter body 26. Filter medium 54 may be a body of activated carbon, of ion exchange resin, of activated alumina, or of a combination of these materials.

Operation of Filter Element

FIG. 1 shows a setup for home use of filter element 28 of the invention. To begin the water filtering operation, refillable dispenser 12 is filled with tap water through filler opening 10, then placed at the edge of an elevated surface such as a table or countertop. Lip holes 18 in filter element 28 are tie points for wire half-loop 16. Wire half-loop 16 slips over adjustable spigot 20 so as to suspend filter element 28 from adjustable spigot 20 and so as to position overflow chamber 24 to catch the water outflow from adjustable spigot 20. Wire half-loop 16 positions overflow chamber 24 so as to provide gap 22 between overflow chamber 24 and adjustable spigot 20. Because of its multiple functions, wire half-loop 16 may be thought of as a suspender-positioner.

Tab 14 is pulled or pushed to initiate, stop or adjust water flow from adjustable spigot 20. Tab 14 is pulled, starting water flow. Water enters overflow chamber 24 and begins to pass through filter body 26 which is rifled with filter medium 54, then through nipple 34, through flexible tube 36, and finally into receiver container 40. However, if tab 14 is adjusted to allow a high flow rate, water will rise in overflow chamber 24 and will overflow through gap 22, even though part of the flow continues through filter body 26. To avoid such a spill, tab 14 is adjusted, increasing the flow rate until the water level in overflow chamber 24 is observed to be rising. The flow rate is then decreased incrementally until the water level just begins to fall.

Refer now to FIG. 3, a cross section of the upper portion of filter element 28. Experience shows that adjustment of the flow rate leads to one of two dynamic conditions in overflow chamber 24: (a) water level rising toward overflow through gap 22, or (b) water level dropping. It is virtually impossible to adjust the flow rate so that the water level in overflow chamber 24 remains at some constant height between inlet 25 (low) and the top edge of overflow chamber 24 (high).

When the flow rate is adjusted so that the water level in overflow chamber 24 is dropping, the level continues to drop until the stream of water from adjustable spigot 20 falls continuously into overflow chamber 24 and passes through inlet screen 44 with no appreciable height of water standing above screen 44. The steady inflow to filter element 28 is equal to the steady outflow. This condition of flow and pressure head at inlet 25 is called a "virtual zero pressure head of water." The remainder of the water contained in refillable dispenser 12 moves through filter element 28 thusly. Therefore water moves more slowly through filter element 28 than if it had an appreciable pressure head at its inlet. Since the water moves more slowly, it has a longer contact time with filter medium 54, and the filtering action is therefore more effective.

As shown in FIG. 3, upper collar 42 and lower collar 46 serve to fix in place inlet screen 44, thereby establishing the position of inlet 25 which allows water to enter filter body 26. Filter body 26 contains filter medium 54 which acts to remove pollutants from water flowing through it. Entrance 23 allows water to enter overflow chamber 24. Cylinder 48 serves as the impermeable wall of both overflow chamber 24 and filter body 26.

Refer to FIG. 2, an exploded view of filter element 28. Stopper 32 fits into outlet 30 and supports outlet screen 50. Inlet screen 44 and outlet screen 50 confine filter medium 54 within filter body 26. Withdrawing stopper 32 allows replacement of exhausted filter medium by fresh filter medium. Filter medium may be supplied in bulk. No disposable filter cartridge is used.

FIG. 2 shows outlet 30 which allows water to leave filter body 26. Axial through hole 52 allows water from outlet 30 to pass through stopper 32. Nipple 34 conveys water from axial through hole 52 and serves as an attachment site for flexible tube 36 which detachably fits over nipple 34.

FIG. 1 shows how nipple 34 connects to flexible tube 36 which conveys filtered water through top opening 38 into receiver container 40 which accumulates filtered water. Flexible tube 36 serves as a convenient conduit when there is a considerable space between the filter element and the receiver. Refillable dispenser 12 may be filled with only one gallon of water so that a one-gallon jug may be used as receiver without the chance of an overflow at the receiver.

FIG. 1 shows the present invention using a refillable dispenser as an adjustable water source. The faucet on a pressurized water line might also serve as a source.

The Overflow Chamber

To aid in understanding overflow chamber 24, suppose that filter body 26 containing filter medium 54, with inlet and outlet screens in place, stands alone and that water is supplied in such a way that water continuously just covers inlet 25, even as water flows through filter body 26. There would be a continuous flow through filter body 26 with a constant flow rate that depends on the resistance to flow of inlet 25 and of those parts of filter element 28 below inlet 25. This constant flow rate will be called the "characteristic flow rate."

Now, suppose that overflow chamber 24 is joined to the inlet 25. If water is fed into overflow chamber 24 at any flow rate appreciably greater than the characteristic flow rate, then the water level in overflow chamber 24 will rise. If the water level is at some height in overflow chamber 24 and the inflow to overflow chamber 24 is adjusted to a flow rate less than the characteristic flow rate, then the water level will fall. Experience shows that it is virtually impossible to adjust the inflow rate so as to maintain a constant, appreciable height of water in overflow chamber 24. The water level either rises or falls.

In actual practice among gravity-flow filters, a filter's dedicated receiver will have capacity of about two quarts or more. This suggests, as does common sense, that it is inconvenient and not worth the bother to setup and operate a gravity-flow filter unless at least about two quarts of filtered water are produced. Many filters have the reservoir size equal to or on-half the receiver size. These two ratios result from the idea that while either one or two discrete fillings of the reservoir to fill the receiver with filtered water are acceptable, three or more fillings are considered inconvenient and unacceptable.

A user of the present invention would have a choice of (a) giving discrete fillings to overflow chamber 24, or (b) establishing a continuous through flow; note that the above general term "reservoir" could substitute for "overflow chamber." In order to produce an acceptable two quarts of filtered water, the user would have to give the 0.4 liter overflow chamber 24 an inconvenient five discrete fillings. Establishing a continuous flow is the convenient alternative. Thus an overflow chamber of 0.4 liters or less encourages and influences the user to establish a continuous through flow.

The overflow chamber need only be large enough to contain a water surge during initial flow adjustment; 0.4 liters is adequate for such a surge. Where a continuous through flow is designed and intended, a reservoir, or overflow chamber, as large as one quart would be contraindicated on grounds of adding unnecessary bulk and of wasting construction material.

Conclusion and Scope of Invention

Thus, the reader will see that the present invention provides a filter which removes certain pollutants to improve tap water for home use, using the well known method of passing water through a filter medium. A wire half-loop enables the suspension of a filter element from a variety of reservoirs that are inherently stable and have adjustable water valves, or suspension from various valved outlets of pressurized water lines. The wire half-loop places the filter element in a functionally suitable position with respect to the water sources. An overflow chamber at the entrance to the filter body induces an adjustment of the water source such that water enters with a virtual zero pressure head. This gives superior filtering effectiveness.

Since filtered water falls from above, a great variety of containers can be used as receivers to collect the water. One suitable receiver is a one-gallon jug. Such jugs are widely available, cheap or free; they may be used to store filtered water and as pouring dispensers.

While the above description contains many specificities, the reader should not construe these as limitations on the scope of the invention, but merely as preferred embodiments thereof. Those skilled in the art will envision many other possible variations within its scope. For example, skilled artisans will readily be able to change the shapes of the overflow chamber and the filter body. The overflow chamber can be made smaller than 0.4 liters. They can replace the wire half-loop by cord, tape or other material. They can replace the closures at inlet and outlet by various combinations of closures that are threaded, glued, welded, taper fitted, compressible stopper or snap fitted. They can apply threads to or otherwise adapt the inlet and outlet of the filter body for such closures. Skilled artisans may incorporate foraminous means in any of the above mentioned closures. Accordingly, the reader is requested to determine the scope of the invention by the appended claims and their legal equivalents, and not by the examples which have been given.

I claim:

1. A filter element for a gravity-flow water filter for home water treatment, comprising:
   (a) a filter body of impermeable material which contains a filter medium selected from the group consisting of activated carbon, activated alumina, and ion exchange resin, said filter body having means defining an inlet and means defining an outlet, said inlet being above said outlet,
   (b) foraminous inlet means fixed at said inlet and foraminous outlet means fixed at said outlet so that a flow of water may pass through the combination of said filter body and said foraminous inlet means and said foraminous outlet means while said filter medium remains inside said filter body,
   (c) an overflow chamber attached to said inlet,
      i) said overflow chamber being formed by an impermeable, stiff wall attached to said filter body in a watertight connection, said stiff wall essentially maintaining its shape if said overflow chamber is filled with water,
      ii) said overflow chamber surrounding and extending above said inlet, the upper edge of said wall forming an entrance to said overflow chamber, whereby water from means defining an adjustable water source may fall into said overflow chamber, and from there move through said inlet into said filter body,
      iii) said overflow chamber being limited in water holding capacity to a maximum of 0.4 liters, whereby said overflow chamber will fill, overflow and spill inconveniently when the flow rate of water entering said overflow chamber exceeds a characteristic flow rate, said characteristic flow rate being the constant flow rate allowed by the resistance to flow presented by said inlet and by the portion of said filter element below said inlet when water continuously just covers said inlet, whereby the possibility of an inconvenient water overflow and spill from said overflow chamber induces and gives motive for a user to introduce water to said overflow chamber by adjusting said adjustable water source to a flow rate less than said characteristic flow rate, which adjustment is guided by noting whether the water level in said overflow chamber is rising or falling, whereby the water level in said overflow chamber will drop until the stream of water from said adjustable water source falls into said overflow chamber and enters said inlet with no appreciable head of water standing above said inlet, whereby water will move more slowly through said filter medium than if there had been an appreciable head of water at said inlet, whereby said filter medium acts more effectively on water flowing through said filter medium, whereby said user is discouraged from the alternative way of introducing water of giving inconveniently numerous discrete fillings to said limited overflow chamber in order to filter a convenient quantity of water,
   (d) a wire half-loop attached to said overflow chamber.

2. The invention of claim 1 further including means defining an adjustable water source.

3. The invention of claim 2 wherein said wire half-loop detachably suspends said overflow chamber from said adjustable water source in a position to capture the outflow from said adjustable water source.

4. The invention of claim 3 wherein said wire half-loop detachably suspends said overflow chamber below said adjustable water source, said wire half-loop being sized so as to provide a gap between said overflow chamber and said adjustable water source, whereby water may overflow through said gap when the flow rate of water entering said overflow chamber from said adjustable water source exceeds said characteristic flow rate, whereby said overflow chamber and said adjustable water source join in a non-watertight connection.

5. The invention of claim 4, further including means defining a plurality of lip holes spaced around the upper portion of said overflow chamber.

6. The invention of claim 5 wherein said wire half-loop is formed by connecting a wire to a pair of said lipholes, whereby said wire half-loop may be loosely placed over a suitable projection on said adjustable water source, said wire being flexible so that said wire half-loop can flex and can conform to said projection, thereby aiding the positioning of said overflow chamber under said adjustable water source.

7. The invention of claim 6 wherein said wire has memory to retain shape, each end of said wire being passed through a different one of said lip holes and loosely twisted back around a portion of said wire that is not passed through one of said lip holes, whereby said wire can be detached and reattached to said lip holes, whereby the length of said wire half-loop may be varied to lengths appropriate for dissimilar adjustable water sources.

8. The invention of claim 2 wherein said adjustable water source is a refillable dispenser, said refillable dispenser being a container for liquids having an adjustable spigot and means defining a filler opening whereby said refillable dispenser may be refilled for repeated uses.

9. The invention of claim 1, further including a stopper of compressible material which is fitted into said outlet with a watertight fit, said stopper having means defining an axial through hole for allowing an outflow from said filter body, said stopper being sized so that it can be put into and withdrawn from said filter body, whereby said filter medium may be inserted into or extracted from said filter body.

10. The invention of claim 9 wherein said foraminous outlet means is an outlet screen of mesh material, said outlet screen covering the upstream interior end of said axial through hole.

11. The invention of claim 10, further including
   (a) a nipple means connected to said axial through hole means for collecting and conveying all treated water that flows through said axial through hole means and
   (b) a flexible tube detachably connected to said nipple means, whereby filtered water can be conveniently conveyed to a receiver container.

12. The invention of claim 1 wherein said filter body and said overflow chamber are formed by a cylinder that is hollow with both ends open.

13. The invention of claim 12 wherein said foraminous inlet means is an inlet screen of mesh material with a circular shape, said inlet screen being sized to fit snugly into said cylinder.

14. The invention of claim 13, further including an upper collar and a lower collar which are of cylindrical shape and are sized to fit snugly into said hollow cylinder, said upper and said lower collars being fixed inside said cylinder, said upper and said lower collars being set close together so as to hold stationary said inlet screen therebetween, whereby the position of said inlet screen establishes and defines the position of said inlet, the portion of said cylinder above said inlet screen thereby being defined as said overflow chamber, and the portion of said cylinder below said inlet screen thereby being defined as said filter body.

* * * * *

UNITED STATES PATENT AND TRADEMARK OFFICE
CERTIFICATE OF CORRECTION

PATENT NO. : 5,322,625
DATED : June 21, 1994
INVENTOR(S) : Gerald Rise

It is certified that error appears in the above-indentified patent and that said Letters Patent is hereby corrected as shown below:

Column 4, line 51, change "wail" to --wall--.
Column 5, line 14, change "rifled" to --filled--.

BEST AVAILABLE COPY

Signed and Sealed this

Thirteenth Day of December, 1994

Attest:

BRUCE LEHMAN

Attesting Officer     Commissioner of Patents and Trademarks